United States Patent Office 3,001,930
Patented Sept. 26, 1961

3,001,930
DEHYDROGENATION OR DEHYDROCYCLISATION OF NON-AROMATIC HYDROCARBONS
Peter Thomas White and Ernest Carlton Housam, Sunbury-on-Thames, England, assignors to The British Petroleum Company Limited, London, England, a British joint-stock corporation
No Drawing. Filed Sept. 17, 1958, Ser. No. 761,460
Claims priority, application Great Britain Sept. 20, 1957
5 Claims. (Cl. 208—136)

This invention relates to the dehydrogenation or dehydrocyclisation of non-aromatic hydrocarbons using a chromium oxide catalyst.

Dehydrogenation and dehydrocyclisation reactions, for example the catalytic reforming of relatively low-boiling petroleum distillates to increase the aromatic content and octane number, using a chromium oxide catalyst, have been previously proposed and the regenerable nature of such catalysts is also known. Since chromium forms several oxides and in a regenerative process the catalyst is subjected alternately to reducing conditions during processing and oxidising conditions during regeneration, changes in the oxide state of the catalyst are potentially possible and the present invention is concerned with the oxide states of the catalyst and their relation to catalyst activity. Under normal conditions of regenerable dehydrogenation and dehydrocyclisation as commercially practiced, that is processing temperatures of from about 700 to 1100° F. and regeneration temperatures of from about 800 to 1300° F., and the use in regeneration of a minimum amount of oxygen, it has been found that the chromium is in the trivalent state as sesquioxide $Cr_2O_3$ and that, it does not alter its valency state during either processing or regeneration. A minor proportion of the chromium can, however, be oxidised under suitable regeneration conditions to the hexavalent state to form the trioxide $CrO_3$. It has been found that oxidation under these suitable regeneration conditions has a considerable beneficial effect on the catalyst activity during processing, although only about 10% or less of trioxide may be formed and although this trioxide is subsequently reduced during processing. Under normal regeneration conditions as commercially practised, that is, under regeneration temperatures of from about 800 to 1300° F., this partial oxidation does not take place since the amount of oxygen used is kept to a minimum. Under these conditions the carbon is preferentially oxidised and the chromium is unaffected. It has been found that until the carbon content of the catalyst is very low no chromium trioxide is formed, and in order to obtain this small but important oxidation of chromium to the hexavalent state it is therefore necessary to oxidise the catalyst specifically and not to rely on a normal regeneration process using only sufficient oxygen to remove the carbonaceous deposits.

According to the present invention a process for the dehydrogenation or dehydrocyclisation of non-aromatic hydrocarbons using a regenerable chromium oxide catalyst comprises contacting a feedstock consisting of or containing non-aromatic hydrocarbons with the catalyst to increase the olefin and/or aromatic content of the feedstock, regenerating the catalyst by burning off carbonaceous deposits, oxidising a proportion only of the chromium to the hexavalent state during or after the regeneration period and re-using the catalyst in a further processing period.

The oxidation of the chromium is preferably carried out during the regeneration period by using an excess of oxygen beyond that required to remove the carbonaceous deposits. The length of time of the regeneration period must be adequate for substantially all the carbonaceous deposits to be burned off and allow the chromium to be oxidised. As stated above no oxidation of the chromium occurs until the carbon content of the catalyst has been reduced to a very low level. In general an increase in the regeneration period increases the catalyst activity. In the case of fluidised bed processes the residence time of the catalyst in the regenerator is preferably at least 15 minutes. A particularly preferred range is from 15 to 100 minutes, especially 15 to 30 minutes. The quantity of excess oxygen present at any given time has not been found to be critical within the range of 1 to 10 mol percent of free oxygen in the regenerator exit gas.

The chromium oxide is preferably on a support such as alumina. When using an alumina-supported catalyst, the upper limit for the regeneration temperature is kept at 1300° F. in order to prevent degradation of the alumina. Under such temperature limitations it has been found that only about 10% of the chromium can be converted to the hexavalent form. The improved activity is not affected by the fact that the hexavalent chromium is subsequently reduced during processing or by a partial reduction of the catalyst before processing. Preferably the hexavalent chromium content is maintained at or near the upper end of this range by suitable adjustment of the length of time of regeneration. As stated above a catalyst residence time in fluidised bed processes of at least 15 minutes is considered suitable. It has been found that satisfactory hexavalent chromium contents have been obtained with such residence times at regeneration temperatures of the order of 1000 to 1200° F.

The catalyst may also contain a minor proportion of one or more promoters, for example, a compound, preferably an oxide, of one of the following elements—a rare earth or mixture of rare earths, bismuth, boron, germanium, nickel, or manganese with or without an alkali metal, preferably potassium. Yet another effective promoter is a minor proportion of a spinel such as cobalt chromite, copper chromite, zinc titanate, or iron chromite either as such or in the form of the naturally-occurring ore chrome ironstone.

A particularly preferred catalyst comprises chromium oxide supported on alumina with or without a minor proportion of an alkali metal oxide, for example potassium oxide, and a minor proportion of a rare earth oxide, for example cerium oxide or a mixture of rare earth oxides.

The preferred proportions of the catalyst constituents by weight of total catalyst material stable at 1020° F. are:

| | Percent |
|---|---|
| Chromite oxide (expressed as $Cr_2O_3$) | 5–25 |
| Promoting compounds (expressed as oxides) | 0.1–5 |
| Alumina | Balance |

The present invention is applicable to dehydrogenation or dehydrocyclisation reactions generally, but is particularly suitable for the up-grading of hydrocarbon fractions to give gasoline blending components of high octane number at a pressure of not more than 50 p.s.i.g. (including atmospheric pressure or below) and without recycle of the hydrogen-containing gas produced or addition of extraneous hydrogen. The feedstocks for such reactions should boil in the gasoline or naphtha range and may be reformates, particularly platinum reformates, the lower boiling relatively aromatic-free fractions of such reformates, pure hydrocarbons, or straight-run, light gasoline fractions such as light gasoline. The temperature is from 840–1075° F., preferably in the vicinity of 975° F., and the preferred space velocity is from 0.1 to 1.0 v./v./hr.

The process according to the invention can be carried out with a fixed bed, a moving bed or a fluidised bed of catalyst. Since, however, the catalyst is regenerable, the process is particularly suitable for moving or fluidised bed operation with cyclic movement of catalyst between a reactor and a regenerator. It is, moreover, in such moving or fluidised bed operations in which the cycle of processing and regeneration is relatively rapid, that the greatest benefit is derived from the increased catalyst activity.

There is yet a further advantage of the reversible oxidation of part of the chromium to the hexavalent state when using a moving or fluidised bed process in that the reduction of the hexavalent chromium during processing can provide a substantial amount of heat towards balancing the endothermic heat of reaction of a dehydrogenation or dehydrocyclisation process. This will be illustrated with reference to the process referred to above.

In a catalytic reforming process, where a light platinum reformate or light straight-run gasoline is reformed over a catalyst of the composition 10% $Cr_2O_3$, 1% $Ce_2O_3$, 1% $K_2O$ dispersed on alumina, a product of 100 Research octane number, clear, is produced from light platinum reformate at 1005° F. and the heat of reaction is 380 B.t.u./lb. The term light platinum reformate means a light fraction of a reformate obtained by reforming over a platinum containing catalyst. A product of 100 research octane number, clear, is produced from light straight-run gasoline at 1005° F. and the heat of reaction is 500 B.t.u./lb. This heat of reaction has normally to be supplied from the heat of combustion of the carbon on the catalyst which raises the temperature of the regenerated circulating catalyst to above the processing temperature.

In the example using light gasoline feedstock, the carbon laid down is 12.6% weight on feed, and burning off of this carbon will provide 1780 B.t.u./lb. of feed. At a reaction temperature of 1005° F., this heat will be sufficient to balance the endothermic heat of reaction of 500 B.t.u./lb. when the heat losses do not exceed 1280 B.t.u./lb. of feed. If the losses do exceed this figure, then heat supplied by combustion with the oxygen released by the reduction of the hexavalent chromium, can help to make up the heat deficiency. In processes operated at a lower severity where the rate of carbon lay down is not so high and hence where the heat made available by burning off the carbon is less, there may be a greater heat balance problem. For example, when processing a light platinum reformate feedstock to 100 octane number research, clear, the carbon laid down is 9.0% weight on feed. The burning off of this carbon will provide 1270 B.t.u./lb. of feed, which allowing for losses of about 1010 B.t.u./lb. of feed, contributes 260 B.t.u./lb. of feed to the heat of reaction. Since the total heat of reaction is 380 B.t.u./lb. this leaves deficiency of about 120 B.t.u./lb. of feed. Normally an external heater would be required to make up the deficiency but by the present invention the deficiency can be made up by maintaining an excess of ca. 12% air in the regenerator over that required for burning off the carbon. At a typical circulating catalyst/oil ratio of 10:1 and using the figures for hexavalent chromium concentration in the regenerated catalyst of 0.75% as Cr VI and in the spent catalyst of nil, 0.034 lb. of oxygen/lb. of feed can be released into the reactor. The heat of reduction of chromium according to the reaction $$2CrO_3 \rightarrow Cr_2O_3 + 1\frac{1}{2}O_2$$

is small (<1 B.t.u./lb. of catalyst) and can be ignored, and the heat of combustion of oxygen in the combustion of the 0.034 lb. of oxygen/lb. of feed, above mentioned, will therefore supply heat to the process. Experimental evidence indicates that this oxygen will react with hydrocarbons, and coke to give CO, $CO_2$ and some $H_2O$, the overall heat of combustion being about 4700 B.t.u./lb. of oxygen, or, using the conditions quoted above, about 150 B.t.u./lb. of feed. This amount will be sufficient to balance the heat deficiency provided the heat losses mentioned above of about 1010 B.t.u./lb. of feed are not exceeded. Should the losses exceed 1010 B.t.u./lb. of feed to any considerable extent an external heater may still be required but it can have a markedly smaller capacity than would otherwise be necessary.

The invention is illustrated by the following example.

EXAMPLE

A light straight-run gasoline having an octane number research clear of 60.4 and an ASTM boiling range of 44–99° C. was treated in a fluidised bed processing unit with a catalyst having the following composition:

| | Percent |
|---|---|
| Chromium oxide (expressed as $Cr_2O_3$) | 10 |
| Potassium oxide | 1 |
| Cerium oxide | 1 |
| Alumina | Balance |

The reactor and regenerator were maintained at a slight positive pressure of the order of 8 p.s.i.g. The other principal conditions in the reactor and regenerator are set out in Table 1 below together with the hexavalent chromium content of the catalyst and inspection data on the product.

Table 1

| Reactor Conditions: | | |
|---|---|---|
| Temperature °F | 1,025 | 1,021 |
| Residence Time min | 25.8 | 31.5 |
| Space velocity $W_o/W_c$/hr | 0.230 | 0.232 |
| Regenerator Conditions: | | |
| Temperature °F | 1,164 | 1,238 |
| Oxygen in Regenerator Exit Gas percent vol | 3.2 | 0.0 |
| Residence Time min | 18 | 18 |
| Gas Space Velocity $V_g/V_c$/hr | 361 | 408 |
| Oxygen Content Inlet Gases percent mol | 20.9 | 11.9 |
| Catalyst ex Regenerator: | | |
| Hexavalent Chromium percent wt | 0.9–1.0 | 0.0 |
| Carbon do | 0.01 | 0.295 |
| Debutanized Product: | | |
| Octane Number, Research, clear | 97.0 | 88.9 |
| Yield on feed percent wt | 57.5 | 59.8 |

From the Table 1 it will be seen that the catalyst regenerated with an excess of oxygen had a hexavalent chromium content of 0.9–1.0% by weight of total catalyst or approximately 10% by weight of the chromium content of the catalyst. This relatively small amount of hexavalent chromium on the catalyst increased the octane number of the product by 8.1 numbers with only a 2.3% weight reduction in yield. The catalyst without any hexavalent chromium had a higher carbon content than the other and in order to determine whether this carbon content had any effect on the catalyst activity, two runs were carried out in a laboratory fixed bed unit using catalyst taken from either the regenerator or the reactor of the fluidised bed unit. In these runs the processing conditions and the catalyst used were identical in all respects except for the carbon content of the catalyst. The results are set out in Table 2 below:

Table 2

| Catalyst | Ex Regenerator | Ex Reactor |
|---|---|---|
| Carbon percent wt | .005 | 1.16 |
| Activity Test: | | |
| Octane Number, Research Clear | 99.0 | 98.6 |
| Yield of debutanized product percent wt | 66.6 | 69.6 |
| Gas make s.c.f./b | 1,805 | 1,270 |
| Hydrogen content of exit gas percent vol | 82 | 77 |

These results indicate that even when the carbon contents of the catalysts are as wide apart as 0.005% wt. and 1.16 wt. respectively there is very little difference in the product octane number. It follows therefore that the effect of the different carbon contents of the catalyst in Table 1 can be discounted.

We claim:

1. A process for the treatment of non-aromatic hydrocarbons to produce a product having an increased aromatic content comprising contacting the hydrocarbon feedstock in a reaction zone with a freshly regenerated catalyst consisting essentially of 5 to 25% chromium oxide and balance alumina with up to about 10% by weight of the chromium content of said catalyst being in hexavalent form as $CrO_3$, at a temperature of from about 840° to 1075° F., at a pressure not in excess of about 50 p.s.i. ga., and in the absence of added hydrogen to said reaction zone, said amount of hexavalent chromium oxide being reduced during said contacting operation to the trivalent state as $Cr_2O_3$ with release of oxygen and evolution of heat from combustion of carbonaceous constituents with the released oxygen in said reaction zone, recovering a product having an increased aromatic content, regenerating the catalyst, when spent, in a regeneration zone by contacting same at a temperature between 800° to 1300° F. with an oxygen medium for a period of time between 15 to 100 min. to burn off substantially all of the carbonaceous deposits formed during said contacting operation, oxidizing said catalyst to effect a conversion of no more than about 10% by weight of the chromium content from its trivalent state to the hexavalent state, re-using the thus oxidized regenerated catalyst in the absence of any further treatment as said freshly regenerated catalyst in a further processing operation of the feedstock under the conditions enumerated to produce an aromatic-enriched product.

2. A process for the treatment of non-aromatic hydrocarbons to produce a product having an increased aromatic content comprising contacting the hydrocarbon feedstock in a reaction zone with a freshly regenerated catalyst consisting essentially of 5 to 25% chromium oxide and balance alumina with up to about 10% by weight of the chromium content of said catalyst being in hexavalent form as $CrO_3$, at a temperature of from about 840° to 1075° F., at a pressure not in excess of about 50 p.s.i. ga., and in the absence of added hydrogen to said reaction zone, said amount of hexavalent chromium oxide being reduced during said contacting operation to the trivalent state as $Cr_2O_3$ with release of oxygen and evolution of heat from combustion of carbonaceous constituents with the released oxygen in said reaction zone, recovering a product having an increased aromatic content, regenerating the catalyst, when spent, in a regeneration zone by contacting same at a temperature between 800° to 1300° with an oxygen medium in excess of that required for regeneration for a period of time between 15 to 100 min. to burn off substantially all of the carbonaceous deposits formed during said contacting operation and to oxidize said catalyst to effect a conversion of no more than about 10% by weight of the chromium content from its trivalent state to the hexavalent state, re-using the thus oxidized regenerated catalyst in the absence of any further treatment as said freshly regenerated catalyst in a further processing operation of the feedstock under the conditions enumerated to produce an aromatic-enriched product.

3. A process in accordance with claim 1 wherein the catalyst is from 0.1 to 5% of a catalyst promoter.

4. A process in accordance with claim 1 wherein the process is a fluidized bed process with cyclic movement of the catalyst between said reaction zone and said regeneration zone.

5. A process in accordance with claim 1 wherein the process is a moving bed process with cyclic movement of the catalyst between the reaction zone and the regeneration zone.

References Cited in the file of this patent

UNITED STATES PATENTS

| | | |
|---|---|---|
| 2,337,191 | Greensfelder et al. | Dec. 21, 1943 |
| 2,784,826 | Drews et al. | Mar. 12, 1957 |

UNITED STATES PATENT OFFICE
CERTIFICATE OF CORRECTION

Patent No. 3,001,930 September 26, 1961

Peter Thomas White et al.

It is hereby certified that error appears in the above numbered patent requiring correction and that the said Letters Patent should read as corrected below.

Column 2, line 55, for "Chromite" read -- Chromium --; line 69, for "lower boiling" read -- lower-boiling --.

Signed and sealed this 3rd day of April 1962.

(SEAL)
Attest:

ERNEST W. SWIDER
Attesting Officer

DAVID L. LADD
Commissioner of Patents